UNITED STATES PATENT OFFICE 2,553,261

HYDROXY-ACYLAMINO AZO DYESTUFFS OF THE NAPHTHALENE SERIES AND A PROCESS OF MAKING SAME

Oscar Knecht and Hans Ischer, Basel, Switzerland, assignors to Sandoz Limited, Basel, Switzerland, a Swiss firm No Drawing. Application December 18, 1947, Serial No. 792,614. In Switzerland December 20, 1946

14 Claims. (Cl. 260—199)

The present invention relates to new and valuable hydroxy-acyl-amino azo dyestuffs of the naphthalene series and to a process for their production. The new dyestuffs are obtained by treating with acylating agents azo dyestuffs of the general formula:

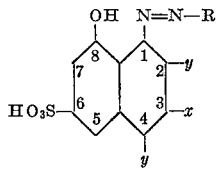

wherein R represents the radical of a diazo compound; $x$ stands for a member of the group consisting of hydrogen and —$SO_3H$ and one of the $y$'s means hydrogen and the other —$NHR'$, $R'$ representing a member of the group consisting of hydrogen, alkyl, cycloalkyl, aralkyl and aryl, and treating subsequently with saponifying agents the dyestuffs which have been acylated simultaneously in the 8-hydroxy group in order to split off the acyl residue attached to the 8-hydroxy group.

It is known that some amino-naphthol-sulfonic acids are capable of coupling twice, once on the amino-side and once on the hydroxy-side as in the case of 1.8-aminonaphthol-3.6-disulfonic acid, known as H-acid. It is further known that three amino-naphtholsulfonic acids disclosed by the aforesaid general formula, namely the 2.8-aminonaphthol-6-sulfonic acid (gamma-acid), the 2.8-aminonaphthol-3.6-disulfonic acid (2 R-acid) and the 1.5-aminonaphthol-7-sulfonic acid (M-acid) only couple once, either on the amino-side or on the hydroxy-side. Contrary to this well known fact it is stated in U. S. Patents No. 2,192,153, Example 2 (page 2, lines 34 to 46) and No. 1,757,498 (page 1, lines 70 to 95) that the monoazo dyestuffs prepared by coupling in an acid medium diazotized o-chlor-aniline-sulfonic acid with gamma acid and diazotized 4-nitroaniline-2-sulfonic acid with 2-phenylamino-8-naphthol-6-sulfonic acid are still capable of coupling once more in an alkaline solution with a diazo-compound. These assertions could not be verified on experimental control. It was found that the second coupling did not take place, this being in full accordance with numerous references in the chemical literature (see Fierz-David, Künstliche organischen Farbstoffe (1926), page 105; F. Mayer, Chemie der organischen Farbstoffe, vol. I, page 38; Ullmann, Enzyclopädie der technischen Chemie, 2d edition, vol. II, page 28, K. H. Saunders, The aromatic diazo-compounds (1936), page 110).

But in continuation of the efforts to promote the desired second coupling the surprising observation was made that the azo dyestuffs obtained from the three aminonaphtholsulfonic acids in question by coupling them in an acid medium with diazo compounds became capable of further being coupled with one molecule of a diazo-component if the primary or secondary amino group contained in the dyestuffs had been acylated previously. This observation is of importance as it allows the manufacture of new and valuable coupling components.

It is therefore one object of the present invention to provide a process for the acylation of azo dyestuffs of the general formula given before. Another object is the embodiment of acylated azo dyestuffs which are new and valuable coupling components allowing the manufacture and production of a large number of hitherto unknown dyestuffs. The manufacture of the new hydroxy-acylamino azo dyestuffs may be performed by known acylating methods as for instance by treating the corresponding hydroxy-amino azo dyestuffs with organic or inorganic acids, their anhydrides or halides. The acylation reaction may be carried out in the presence or in the absence of solvents such as water, acetone, benzene, pyridine or other tertiary bases. As neutralizing agents may be used for example organic bases, sodium acetate, potassium carbonate, calcium carbonate, calcium hydroxide and the like. In some cases the acylating reaction may be catalyzed by the addition of sulfuric acid, acetyl sulfuric acid, sulfo acetic acid, amino sulfonic acid, phosgene and the like. The following compounds are examples of preferred acylating agents without being restricted thereto: formic acid, acetic acid, acetyl chloride, acetic anhydride, thioacetic acid, chloro-acetyl chloride, ethyl chlorocarbonate, butyryl chloride, stearyl chloride, benzoyl chloride, nitro-benzoyl chlorides, anisoyl chlorides, cinnamoyl chloride, naphthoyl chloride, alkyl-sulfonyl chlorides and aryl-sulfonyl chlorides. Further may be used the anhydrides and halides of polybasic acids such as phosgene, thiophosgene, chloro-sulfonic acid, sulfurtrioxide, phthalic anhydride, oxalic acid, iso-cyanates, cyanuric chloride and the like.

In the case where the 8-hydroxy group has been acylated simultaneously, the o-acyl-residue must be removed by a treatment with saponifying agents such as sodium carbonate, ammonia, sodium hydroxide, acetic acid or inorganic acids of moderate concentrations at temperatures between 0° and 100° C. The hydrolysis of other acylated hydroxy or amino groups which might be present in the radicals R or R' can be effected in a similar way.

The following examples without being limitative illustrate the present invention, the parts being by weight.

Example 1

39 parts of the monoazo dyestuff obtainable by coupling diazotized 2-nitroaniline with gamma-acid in an acid medium are dissolved at room temperature in 50 parts of sulfuric acid monohydrate. To this solution are added with cooling 100 to 150 parts of acetic anhydride whereupon stirring of the mixture is continued for a few hours until the acetylation is complete. Then the reaction mixture is poured on ice, filtered off and the separated yellowish acetyl dyestuff treated for a short time at room temperature with a 10% sodium hydroxide solution in order to hydrolyse the O-acetyl group. Then the dyestuff is precipitated by neutralizing with hydrochloric acid, filtered off and dried at low temperature. The hydroxyacetylamino azo dyestuff thus obtained is a dark powder and dyes wool in violet-red shades and couples with diazo-compounds. It is soluble in concentrated sulfuric acid with a blue coloration, whereas the primary dyestuff dissolves with a red color.

If in this example the 2-nitro-diazobenzene is replaced for instance by the diazo compounds of 3- or 4-nitro-aniline, aniline, chloraniline, anisidine, tolluidine, 3 - nitro-4 - aminophenyl - 1 - methyl-sulfone, 1- or 2-naphthylamine, 1-amino-2-methylnaphthalene, 1 - amino - 2 - methoxy-naphthalene, other hydroxy-acetylamino azo dyestuffs are obtained which are capable of coupling with diazo compounds.

Example 2

To the mixture of 50 parts of sulfuric acid monohydrate and 150 parts of acetic anhydride are added at room temperature 45 parts of the monoazo dyestuff obtainable by coupling diazotized metanilic acid with gamma-acid in an acid medium. After having stirred the mixture for about two hours the condensation is finished and the reaction mixture is diluted with acetone whereby the O.N-diacetyl dyestuff is precipitated. The separated dyestuff is dissolved in a 5% sodium carbonate solution and heated for a short time at 40° to 50° C. in order to hydrolyse the O-acetyl group. Then the dyestuff is salted out, filtered and dried at low temperature.

The thus obtained hydroxy-acetylamino azo dyestuff is a brown powder and dyes wool in orange-red shades. It is soluble in concentrated sulfuric acid with a blue coloration, whereas the unacetylated dyestuff dissolves with a violet color. The new azo dyestuff couples with diazo-compounds.

If in this example the diazotized metanilic acid is replaced by the diazo compound of orthanilic acid, sulfanilic acid, aniline-2.5-disulfonic acid, 2-chloro-aniline-4-sulfonic acid, 2-chloro-aniline-5-sulfonic acid, 4-chloro-aniline-2-sulfonic acid, 2-amino-5-acetyl-amino-benzene-1-sulfonic acid, 2-amino-5-nitrobenzene-1-sulfonic acid, dehydrothiotoluidine-mono- or disulfonic acid or an aromatic amino-carboxylic acid such as anthranilic acid, 3-amino-benzoic acid, 3-amino-4-methyl-benzoic acid, 6 - chloro - 5 - nitro - 2 - amino-benzoic-3-sulfonic acid, napthionic acid, 2-naphthylamine-6-sulfonic acid, 2-naphthylamine-1-sulfonic acid, 2-naphthylamine-4.8-disulfonic acid and the like, other hydroxy-acetylamino-azo-dyestuffs are obtained which are capable of coupling with diazo compounds.

Example 3

To the mixture of 100 parts of concentrated sulfuric acid and 250 parts of acetic anhydride are added at room-temperature 50 parts of the monoazo dyestuff obtainable by coupling diazotized 5-amino-2-hydroxy-benzoic-3-sulfonic acid with 2-amino-8-hydroxy-naphthalene-6-sulfonic acid in an acid medium, and the mixture stirred for about 5 hours at normal temperature. As soon as the primary amino group may no more be detected, the precipitated triacetyl compound is filtered off and heated for a short time to 70° to 80° C. in a 5% sodium carbonate solution in order to hydrolyse the two O-acetyl groups. The thus obtained hydroxy-acetylamino azo dyestuff is separated and dried at low temperature. The dry dyestuff is a red-brown powder dyeing wool in red-brown shades and coupling easily with diazo compounds. In concentrated sulfuric acid it is soluble with a deep blue color whereas the original dyestuff dissolves with a violet color.

By replacing the 5-amino-2-hydroxy-benzoic-3-sulfonic acid by another amino-hydroxy-benzoic acid such for instance as 5-amino-2-hydroxy-benzoic acid, 4-amino-2-hydroxy-benzoic acid, 5-amino-3-methyl-2-hydroxy-benzoic acid or derivatives thereof, such as 5-(4'-amino-1'-benzoylamino)-3-methyl-2-hydroxy-benzoic acid and the like, similar hydroxy-acetylamino-azo dyestuffs capable of coupling with diazo-compounds are obtained.

Example 4

85 parts of the disazo dyestuff obtainable by coupling one mole of tetrazotized benzidine-3.3'-disulfonic acid with two moles of 2-amino-8-hydroxy-naphthalene-6-sulfonic acid in an acid medium are dissolved in 150 parts of sulfuric acid monohydrate. To this solution are added 300 parts of acetic anhydride whereupon stirring of the mixture is continued until the acylation is complete. Then the precipitated dyestuff is filtered, washed with acetone and heated for a short time in a diluted sodium carbonate solution in order to split off the acetyl group attached to the 8-hydroxy group. When the hydrolysis of the O-acetyl-group is complete, the diacetyl diamino azo dyestuff is salted out, filtered and dried. It is a dark powder dyeing wool in brown-red shades, whereas the unacetylated dyestuff yields bluish violet shades. The new azo dyestuff is capable of coupling with diazo-compounds.

If in this example the benzidine-3.3'-disulfonic acid is replaced by other benzidine-di- or monosulfonic acids, benzidine-sulfone-disulfonic acid or benzidine, tolidine, dianisidine or aromatic diamines containing a —NH.CO—, —NH.CO.NH—, —NH.CS.NH— or a cyanuric-bridge, such as 4.4'-diamino-benzanilide, 4.4'-diamino-diphenyl urea or 4.4'-diamino-diphenyl thiourea, other hydroxy-acetylamino azo dyestuffs are obtained which are capable of coupling with diazo compounds.

Example 5

To the mixture of 100 parts of sulfuric acid monohydrate and 250 parts of acetic anhydride are added 55 parts of the monoazo dyestuff obtainable by combining diazotized 4-chloro-5-nitro-2-amino-phenol with gamma acid in an acid medium. The mixture is heated to 70° to 80° C. and, as soon as the primary amino group can be detected no more, it is cooled to room temperature and poured on ice. The orange triacetyl dyestuff is filtered and heated for a short time to 80° C. in a diluted sodium carbonate solution. When the hydrolysis of the two O-acetyl-groups is complete, the dyestuff is separated and dried at low temperature. The thus obtained acetylamino azo dyestuff is a black powder, which is soluble in concentrated sulfuric acid with a blue color, the primary dyestuff however being soluble with a violet color. The new dyestuff is capable of coupling with diazo compounds and dyes wool in red-violet shades changing, when after-treated with chrome-salts, to brown, whereas the violet shades of the original dyestuff become greenish black.

If in this example the 4-chloro-5-nitro-2-aminophenol is replaced by 2-aminophenol, 4-nitro-2-aminophenol-6-sulfonic acid, 6-nitro-2-amino-phenol-4-sulfonic acid, 5-nitro-2-amino-phenol, 4-chloro-6-nitro-2-amino-phenol, 2-amino-4-methyl-phenol, 1-amino-2-naphthol, 2-amino-1-naphthol-4-sulfonic acid, 1.8-amino-naphthol-3.6-disulfonic acid and the like, other hydroxy-acylamino azo dyestuffs are obtained, which are capable of coupling with diazo compounds. In the case, where the diazo compounds of the amino-phenols possess a low coupling power, the primary dyestuffs may be prepared by using aminophenols or aminonaphthols with protected hydroxy groups such as for instance their p-toluene sulfonates, benzoates or the corresponding esters of other organic acids. Subsequently to the acylation of the dyestuffs these esters may be saponified again with alkaline means.

*Example 6*

45 parts of the original dyestuff of example 2 are added at room-temperature to the mixture of 300 parts of dry pyridine and 30 parts of benzoylchloride. When the acylation is complete the reaction mixture is diluted with water and acidified with hydrochloric acid in order to precipitate the dyestuff. After filtering the dyestuff is heated for a short time to 70° C. in a diluted sodium carbonate solution in order to split off the benzoyl radical attached to the 8-hydroxy group. Then the dyestuff is salted out, filtered and dried at low temperature. The thus obtained hydroxy-benzoylamino azo dyestuff which is a dark powder dyes wool in orange-brown shades and is capable of coupling with diazo compounds. In concentrated sulfuric acid it dissolves with a bluish grey, while the original dyestuff dissolves with a violet color.

In the same manner the acylation may be carried out if, instead of benzoyl chloride, there are used other acylating agents such as for instance acetyl chloride or acetic anhydride, chloroacetyl chloride, p-toluene-sulfonyl chloride, phosgene and the like, whereby the corresponding acylamino azo dyestuffs capable of coupling with diazo compounds will be obtained.

*Example 7*

To the mixture of 100 parts of sulfuric acid monohydrate and 250 parts of acetic anhydride are added with stirring 55 parts of the monoazo dyestuff obtainable by coupling diazotized 5-nitro-2-aminobenzol-1-sulfonic acid with 2-phenylamino-8-naphthol-6-sulfonic acid in an acid medium, and the mixture stirred at room temperature for 10 to 12 hours until the condensation is complete. Then the reaction mixture is diluted with acetone, the yellow-brown dyestuff filtered off and heated for a short time to 50° C. in a 5% sodium carbonate solution, salted out, filtered and dried at low temperature. The thus obtained acetyl-phenylamino azo dyestuff is a brown powder dyeing wool in brown shades, whereas the dyeings of the original dyestuff are blue. The new azo dyestuff is capable of coupling with diazo compounds.

If in this example the 2-phenylamino-8-naphthol-6-sulfonic acid is replaced by the 2-tolyl-amino-8-naphthol-sulfonic acid or 2-naphthyl-amino-8-naphthol-6-sulfonic acid, 2-methyl-amino-8-naphthol-6-sulfonic acid, 2-(β-hydroxy-ethylamino)-8-naphthol-6-sulfonic acid, 2-(carboxy-methylamino)-8-naphthol-6-sulfonic acid, 2-cyclohexylamino-8-naphthol-6-sulfonic acid and the like, other acetylamino azo dyestuffs are obtained, which are capable to couple with diazo compounds.

For the preparation of the unacetylated dyestuffs there may also be used, instead of 5-nitro-2-amino-benzenesulfonic acid, the diazo-components cited in the Examples 1 to 5.

*Example 8*

55 parts of the monoazo dyestuff obtainable by coupling diazotized 5-nitro-2-aminobenzene sulfonic acid with 2-amino-8-naphthol-3.6-disulfonic acid in an acid medium are dissolved in 100 parts of concentrated sulfuric acid. To this solution are added with cooling 250 parts acetic anhydride, whereupon the whole is stirred at room temperature for about 3 hours. When the condensation is finished, the reaction mixture is poured on ice and the dyestuff precipitated by adding salt, filtered and heated for a short time to 60° C. in a 2% sodium hydroxide solution in order to hydrolyse the O-acetyl group. Then the solution is neutralized with hydrochloric acid and the dyestuff separated in the usual manner. The dry dyestuff is a yellow brown powder and couples easily with diazo compounds. It dyes wool in brown shades, whereas the primary dyestuff yields violet dyeings. For the manufacture of the primary dyestuff there may also be used, instead of 5-nitro-2-amino-benzenesulfonic acid, the diazo components cited in the Examples 1 to 5.

*Example 9*

To the mixture of 200 parts of glacial acetic acid and 50 parts of acetic anhydride are added 48 parts of the monoazo dyestuff obtainable by coupling diazotized 2-aminonaphthalene-5-sulfonic acid with 1-amino-5-naphthol-7-sulfonic acid in an acid medium. The whole is boiled for a few hours until the acetylation is finished. After cooling the precipitated dyestuff is filtered and heated for a short time in diluted sodium carbonate solution in order to hydrolyse the O-acetyl group. Then the dyestuff is salted out, filtered and dried at low temperature. The thus obtained new acetylamino azo dyestuff is a brown-red powder dyeing wool in orange-red shades and coupling easily with diazo compounds. In concentrated sulfuric acid it dissolves with a red color, the primary dyestuff however dissolves with a blue color. For the manufacture of the original dyestuffs there may also be used, instead of the 2-aminonaphthalene-5-sulfonic acid, the diazo components cited in the Examples 1 to 5.

*Example 10*

To the mixture of 100 parts of glacial acetic acid and 10 parts of fuming sulfonic acid of 65% $SO_3$ are added gradually at 30° to 50° C. 50 parts of the monoazo dyestuff obtainable by coupling diazotized 3-amino-benzene-1-sulfonethylphenylamide with 2-amino-8-naphthol-6-sulfonic acid in an acid medium and 90 parts of fuming sulfuric acid of 65% $SO_3$ allowing to run in in a period of about 7 hours. As soon as the acetylation is complete, the whole is poured into the freezing mixture of about 750 parts of a 30% sodium hydroxide solution and 1000 parts of ice whereby simultaneously the O-acetyl group is saponified. Then the strong alkaline solution is neutralized with hydrochloric acid and the precipitated dyestuff filtered and dried at low temperature. The thus obtained acetylamino azo dyestuff which is a dark powder, is soluble in water with a red brown color and dyes wool in brown red shades. The new dyestuff is capable of coupling with diazo compounds.

If in this example the 3-aminobenzene-1-sulfonethylphenylamide is replaced by 3-aminobenzene-1-sulfonic amide or derivatives or an isomeric compound thereof such as 2-aminobenzene-1-sulfonethylphenylamide, 2-aminobenzene-1-sulfonanilide, 4-aminobenzene-1-sulfonanilide, 3-aminobenzene-1-sulfonedipenylamide, 4-aminobenzene-1-sulfonethylphenylamide, 1-methyl-4-aminobenzene-3-sulfonanilide, 1-methyl-4-aminobenzene-3-sulfonebenzylphenylamide, 3-aminobenzene-1-sulfonebenzyl-1',4'-xylyl-amide or aminophenylsulfones such as 2-amino-phenylmethylsulfone, 4-aminophenylethylsulfone, 4-aminodiphenylsulfone, 4-amino-3-nitrodiphenylsulfone, 4-amino-3,5-dinitrophenyltolylsulfone, other new acetylamino azo dyestuffs may be obtained, which are capable to couple with diazo compounds.

What we claim is:

1. A process for the manufacture of hydroxyacylamino dyestuffs of the naphthalene series, which comprises the steps of treating with an acylating agent an azo dyestuff corresponding to the formula

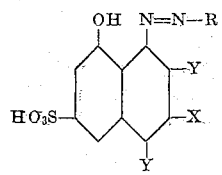

wherein R represents a member selected from the group consisting of benzene and naphthalene radicals, X represents a member of the group consisting of hydrogen and SO₃H, one Y represents hydrogen and the other Y represents NH₂, and of treating the dyestuff, in which the NH₂ and OH groups have been simultaneously acylated, with an alkaline saponifying agent, whereby the 8-OH group is restored.

2. A process for the manufacture of hydroxyacylamino dyestuffs of the naphthalene series, which comprises the steps of treating with an acylating agent an azo dyestuff corresponding to the formula

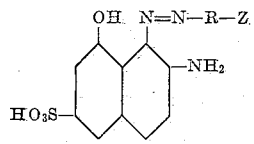

wherein R represents a member selected from the group consisting of benzene and naphthalene radicals, Z represents a negative substituent chosen from the group consisting of SO₃H, COOH, NO₂, OH, Cl, SO₂NH₂, SO₂NH-lower alkyl, SO₂NH-phenyl,

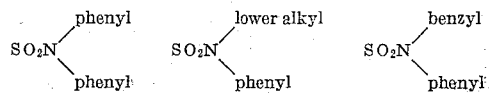

SO₂-lower alkyl, SO₂-phenyl and SO₂-benzyl, and of treating the dyestuff, in which the NH₂ and OH groups have been simultaneously acylated, with an alkaline saponifying agent, whereby the 8-OH group is restored.

3. A process for the manufacture of hydroxyacylamino dyestuffs of the naphthalene series, which comprises the steps of treating with an acylating agent an azo dyestuff corresponding to the formula

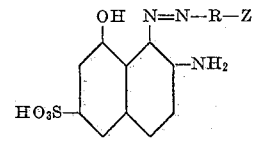

wherein R represents a benzene radical, Z represents a negative substituent chosen from the group consisting of SO₃H, COOH, NO₂, OH, Cl, SO₂NH₂, SO₂NH-lower alkyl, SO₂NH-phenyl, SO₂N(phenyl)(phenyl)    SO₂N(lower alkyl)(phenyl)    SO₂N(benzyl)(phenyl)

SO₂-lower alkyl, SO₂-phenyl and SO₂-benzyl, and stands in o-position to the azo-bridge, and of treating the dyestuff, in which the NH₂ and OH groups have been simultaneously acylated, with an alkaline saponifying agent, whereby the 8-OH group is restored.

4. A process for the manufacture of hydroxyacetylamino dyestuffs of the naphthalene series, which comprises the steps of treating with an acetylating agent an azo dyestuff corresponding to the formula

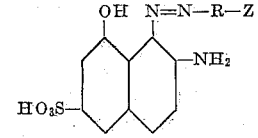

wherein R represents a benzene radical, Z represents a negative substituent chosen from the group consisting of SO₃H, COOH, NO₂, OH, Cl, SO₂NH₂, SO₂NH-lower alkyl, SO₂NH-phenyl, SO₂N(phenyl)(phenyl)    SO₂N(lower alkyl)(phenyl)    SO₂N(benzyl)(phenyl)

SO₂-lower alkyl, SO₂-phenyl and SO₂-benzyl, and stands in o-position to the azo-bridge, and of treating the dyestuff, in which the NH₂ and OH groups have been simultaneously acetylated, with an alkaline saponifying agent, whereby the 8-OH group is restored.

5. A process for the manufacture of a hydroxyacetylamino dyestuff of the naphthalene series, which comprises the steps of treating with an acetylating agent an azo dyestuff corresponding to the formula

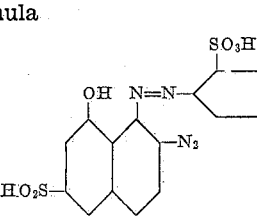

and of treating the acetylated product, in which the NH₂ and OH groups have been simultaneously acetylated, with an alkaline saponifying agent, whereby the 8-OH group is restored.

6. A process for the manufacture of a hydroxyacetylamino dyestuff of the naphthalene series, which comprises the steps of treating with an acetylating agent an azo dyestuff corresponding to the formula

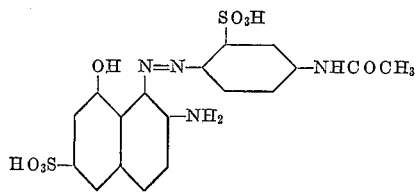

and of treating the acetylated product in which the $NH_2$ and OH groups have been simultaneously acetylated, with an alkaline saponifying agent, whereby the 8-OH group is restored.

7. A process for the manufacture of a hydroxy-acetylamino dyestuff of the naphthalene series, which comprises the steps of treating with an acetylating agent an azo dyestuff corresponding to the formula

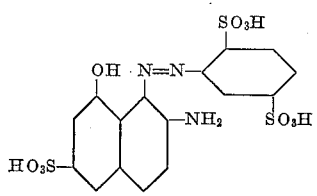

and of treating the acetylated product, in which the $NH_2$ and OH groups have been simultaneously acetylated, with an alkaline saponifying agent, whereby the 8-OH group is restored.

8. A hydroxy-acylamino azo dyestuff corresponding to the formula

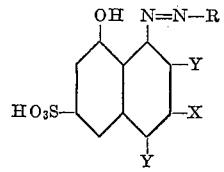

wherein R represents a member selected from the group consisting of benzene and naphthalene radicals, X represents a member of the group consisting of hydrogen and $SO_3H$, and one Y represents hydrogen and the other Y represents an acylamino group.

9. A hydroxy-acylamino azo dyestuff corresponding to the formula

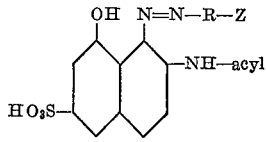

wherein R represents a member selected from the group consisting of benzene and naphthalene radicals, Z represents a negative substituent chosen from the group consisting of $SO_3H$, COOH, $NO_2$, OH, Cl, $SO_2NH_2$, $SO_2NH$-lower alkyl, $SO_2NH$-phenyl, $$SO_2N\binom{phenyl}{phenyl} \quad SO_2N\binom{lower\ alkyl}{phenyl} \quad SO_2N\binom{benzyl}{phenyl}$$

$SO_2$-lower alkyl, $SO_2$-phenyl and $SO_2$-benzyl.

10. A hydroxy-acylamino azo dyestuff corresponding to the formula

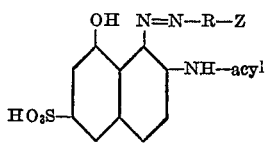

wherein R represents the radical of a diazo compound of the benzene series, Z represents a negative substituent chosen from the group consisting of $SO_3H$, COOH, $NO_2$, OH, Cl, $SO_2NH_2$, $SO_2NH$-lower alkyl, $SO_2NH$-phenyl, $$SO_2N\binom{phenyl}{phenyl} \quad SO_2N\binom{lower\ alkyl}{phenyl} \quad SO_2N\binom{benzyl}{phenyl}$$

$SO_2$-lower alkyl, $SO_2$-phenyl and $SO_2$-benzyl, and stands in o-position to the azo-bridge.

11. A hydroxy-acetylamino azo dyestuff corresponding to the formula

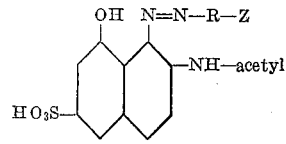

wherein R represents the radical of a diazo compound of the benzene series, Z represents a negative substituent chosen from the group consisting of $SO_3H$, COOH, $NO_2$, OH, Cl, $SO_2NH_2$, $SO_2NH$-lower alkyl, $SO_2NH$-phenyl, $$SO_2N\binom{phenyl}{phenyl} \quad SO_2N\binom{lower\ alkyl}{phenyl} \quad SO_2N\binom{benzyl}{phenyl}$$

$SO_2$-lower alkyl, $SO_2$-phenyl and $SO_2$-benzyl, and stands in o-position to the azo-bridge.

12. The hydroxy-acetylamino azo dyestuff of the formula

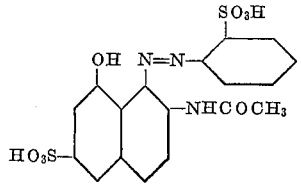

13. The hydroxy-acetylamino azo dyestuff of the formula

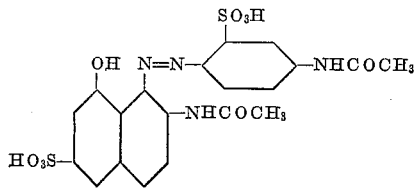

14. The hydroxy-acetylamino azo dyestuff of the formula

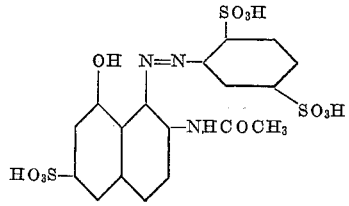

OSCAR KNECHT.
HANS ISCHER.

REFERENCES CITED

The following references are of record in the file of this patent:

UNITED STATES PATENTS

| Number | Name | Date |
| --- | --- | --- |
| 1,123,430 | Tropp et al. | Jan. 5, 1915 |
| 1,408,405 | Schoner et al. | Feb. 28, 1922 |
| 1,757,498 | Baddiley et al. | May 6, 1930 |
| 2,135,964 | Dahlen et al. | Nov. 8, 1938 |
| 2,192,153 | Roos | Feb. 27, 1940 |
| 2,288,518 | Fleischhauer et al. | June 30, 1942 |
| 2,374,157 | Kvalnes | Apr. 17, 1945 |